April 24, 1951 G. W. REITZ 2,549,932

NONINTERLOCKING REVERSING TRANSMISSION

Filed Sept. 30, 1946 4 Sheets-Sheet 1

INVENTOR.
GEORGE W. REITZ
BY Wilfred E. Lawson
ATTORNEY

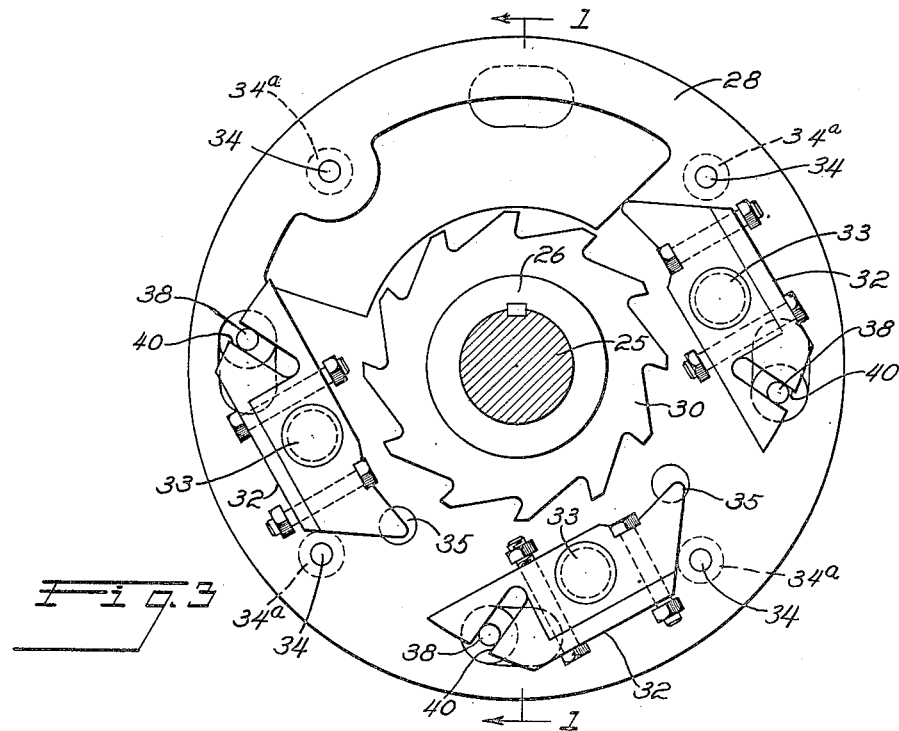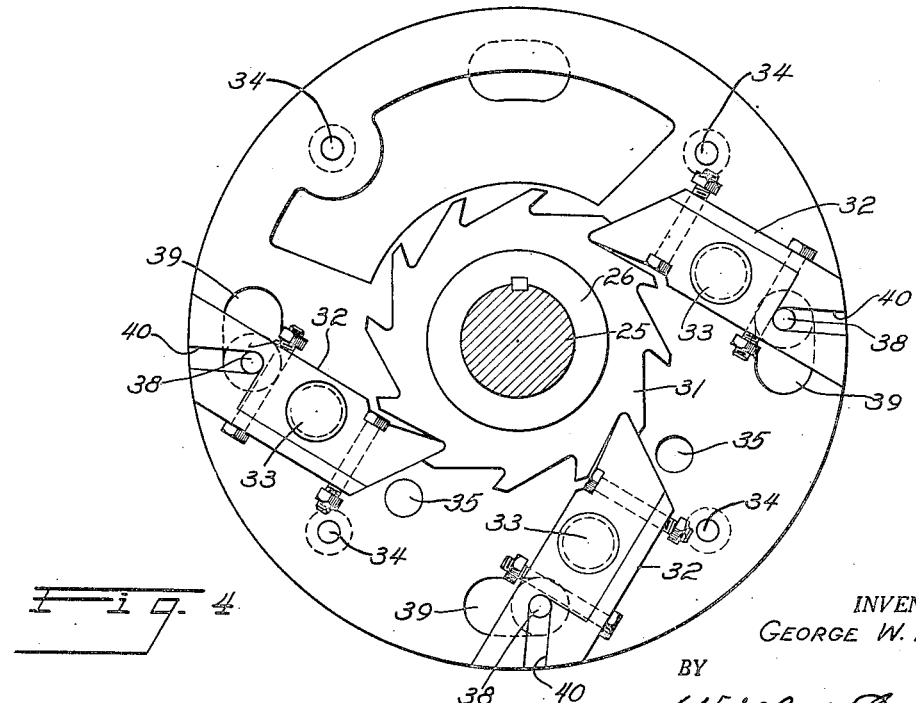

INVENTOR.
GEORGE W. REITZ
BY
Wilfred Lawson
ATTORNEY

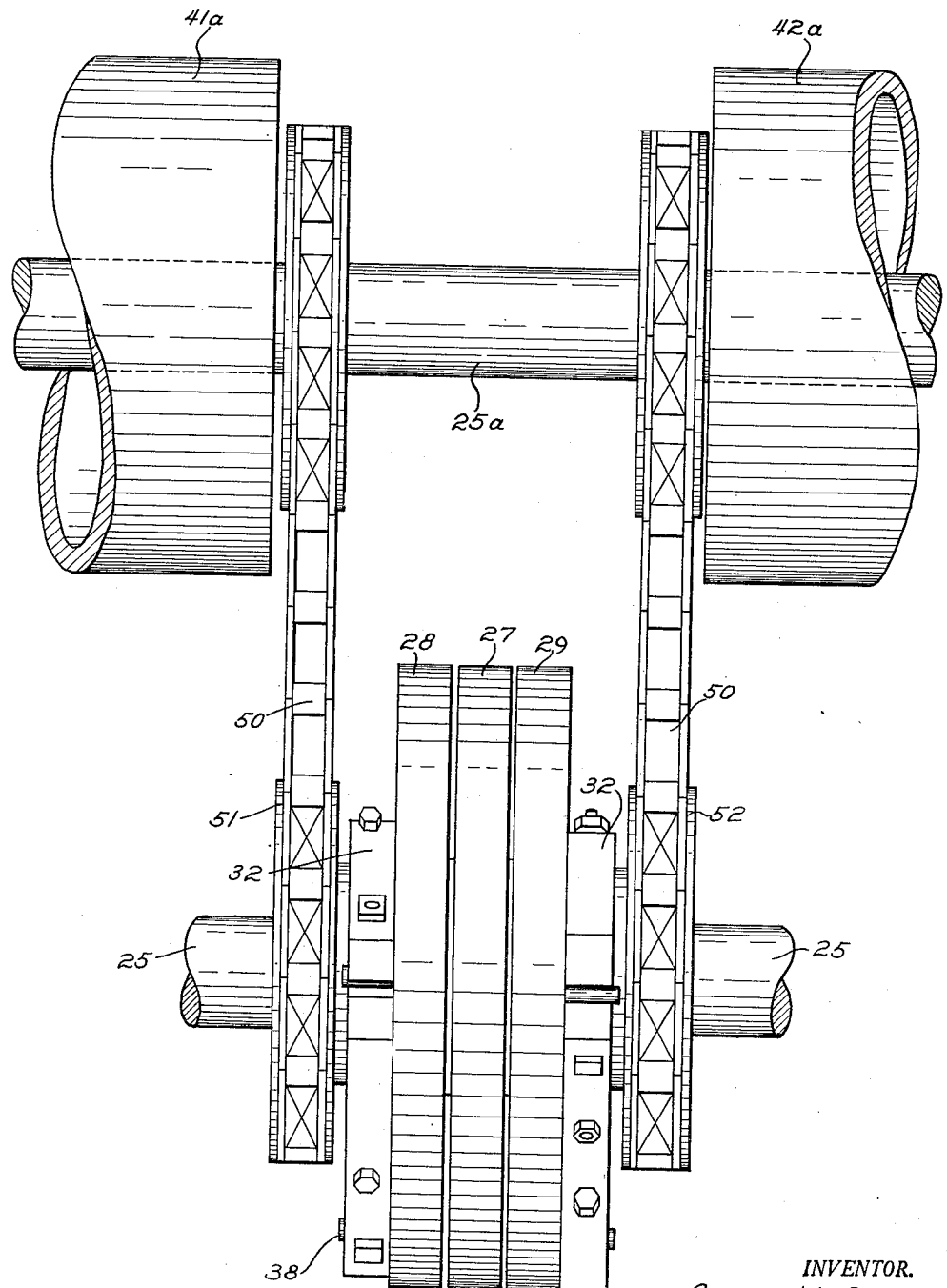

Patented Apr. 24, 1951

2,549,932

UNITED STATES PATENT OFFICE 2,549,932

NONINTERLOCKING REVERSING TRANSMISSION

George W. Reitz, Paris, Ark.

Application September 30, 1946, Serial No. 700,297

4 Claims. (Cl. 254—185)

The present invention relates to a non-interlocking transmission especially adapted for hoists having one drum for pulling a drag line and another drum for playing out the line or rope. Ordinarily, in a hoist, the load rope experiences a considerable stretch, about 4%, and as a consequence, if power is cut off suddenly, this will cause the load drum to rebound, if any type of ratchet or direct connection is used, and the opposite drum will take hold before stretch in the rope is dissipated so that, if rocked back and forth, it will have to break the rope. This is particularly noticeable where rope is connected to opposite ends of the same object, that is pulled back and forth by two drums on the same hoist in which first one and then the other rope experiences the load or the stretch.

This disadvantage will not occur with any two drums in conjunction with each other, by the use of my non-interlocking ratchet device.

This transmission is keyed on a drive shaft operated by any suitable source of power, such as an electric motor for instance. The hoisting drums may be mounted, one on each side, of this transmission on said drive shaft or as an alternative on a secondary shaft paralleled thereto.

In the accompanying drawings the invention is shown described in its simplest form.

Figure 3 is an end view seen from the left of Figure 2 with the drum removed and the left ratchet wheels and pawls out of engagement;

Figure 4 is an end view seen from the right of Figure 2 with the drum removed and the right ratchet wheel and pawls in engagement;

Figure 7 a front view of a modified form of the device with sprocket chain drive for hoisting drums carried on a separate shaft.

Figures 1, 2:
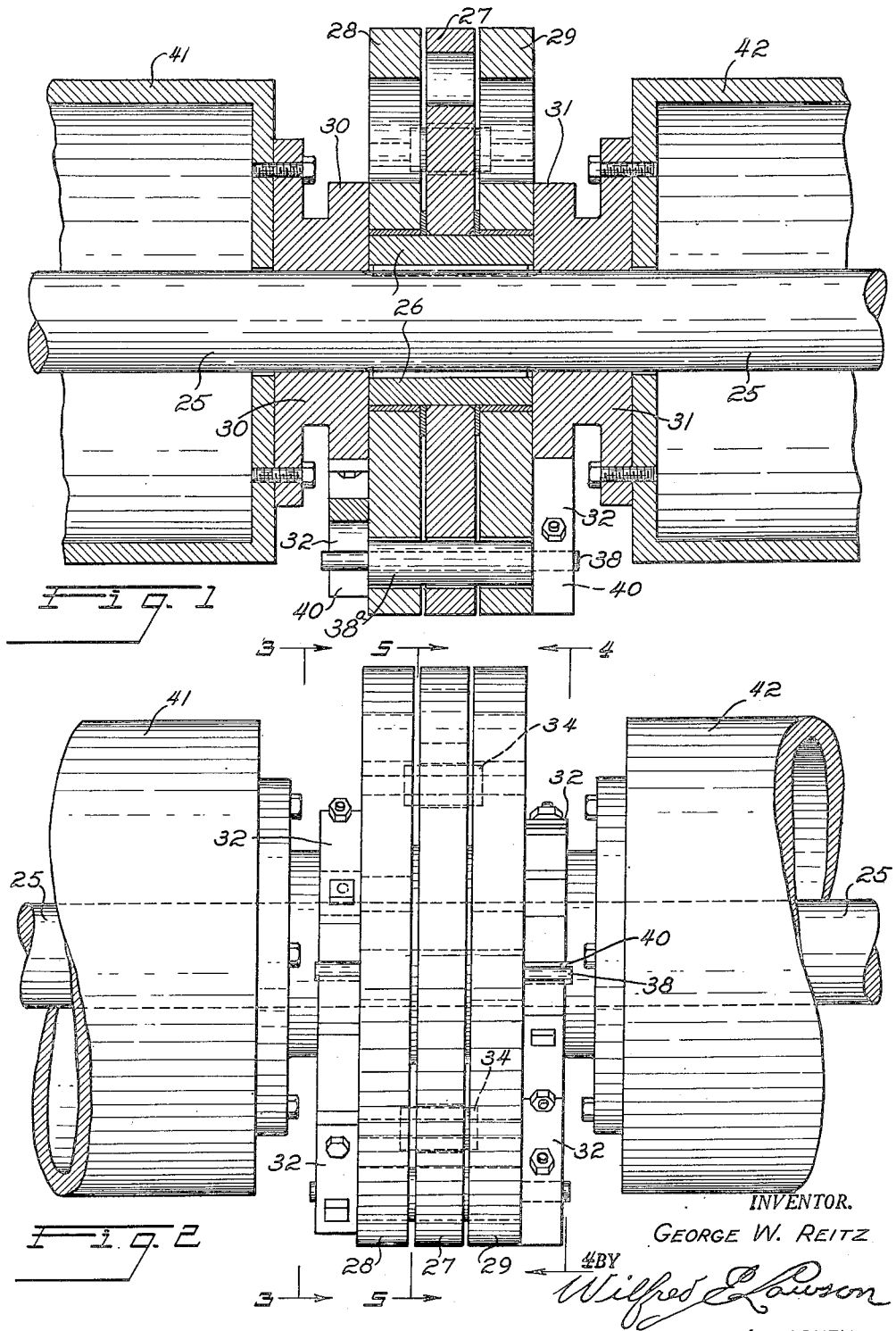
Figure 1 is a vertical section along line 1—1 of Figure 3 of the transmission assembled between two hoisting drums on the drive shaft.
Figure 2 is a front view of the same.
Figure 5:
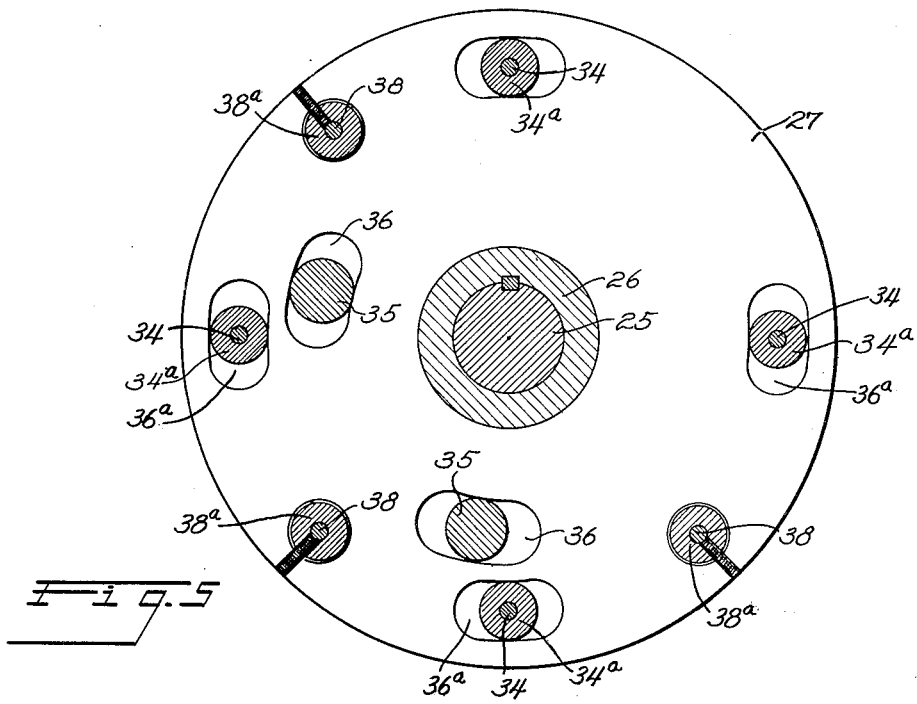
Figure 5 is a left side elevation of the main or control drive disk in neutral position.
Figure 6:
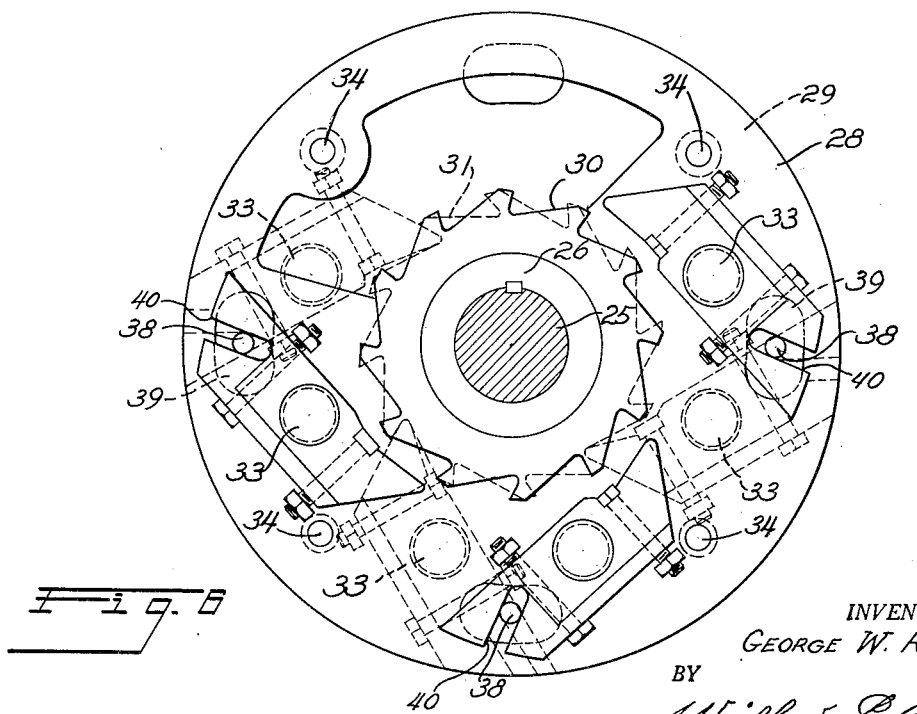
Figure 6 is a similar view of the two driven disks with ratchet pawls in neutral position.

On the drive shaft 25 is keyed the hub 26 of the main or central disk 27 forming a unit therewith and extending in both directions far enough to carry the two side disks 28 and 29 to run loosely thereon. On the side of the transmission disks is positioned a hoist drum 41 for pulling a line or cable, and on the other side of said disks another drum 42 for paying out the line. These drums move freely as regards the main shaft 25 and each drum is provided with a ratchet plate 30 and 31 respectively on their inner ends. The ratchet plate 30 has right hand teeth and plate 31 left hand teeth. The side disks are each provided with ratchet pawls 32 in opposite directions corresponding to the ratchet plates 30 and 31. There are here shown three pawls on each side disk carried on rocker pins 33 which are pivoted to the disks 28, 29. These side disks are rigidly secured together by several connector pins 34 and 35 so that they always rotate in unison. The pins 34 pass through spacer sleeves 34a. Since the disks 28, 29 turn relatively as regards the main disk 27. The disk 27 is provided with elongated openings 36 and 36a for the connectors 34, 35 and sleeve 35a to move in.

On the center or main disk 27 is secured a set of pawl shifting gear pins 38 secured in and extending through sleeves 38a. These sleeves extend at their ends through circumferentially elongated openings 39 provided in the side disks 28, 29. The ends of these gear pins engage in slots 40 of the pawls 32, inclined at a suitable angle against the radius of the disks. Clearly the circumferential movement of the main disk 27 as regards the side disks 28, 29 upon reversing the direction of turning of the drive shaft 25, will cause the gear pins 38 to move inwardly along the slots 40 of the pawls 32 on one side and simultaneously to move outwardly the pawls on the other side. As a consequence the one set of pawls 32 will be lifted out of the corresponding ratchet teeth on one drum 41 and engage the teeth of the drum 42 on the other side. This then reverses the direction of turning of the drums.

Now since the pawls 32 are pivoted on the outer disks 28, and 29 and set to operate in opposite directions and the gear pins 38, fixed in the main plate 27 travel in slots in the side disks 28, 29, therefore the gear pins must move inwardly in the slots 40 of the pawls to drive in one direction, and outwardly to drive in the opposite direction; and when the drive pins 38 engage in center of slots 40 all pawls are released or in neutral. One set must be free while the other set of pawls is engaged. If there is a stretch in the rope on one drum giving a reverse pull, the pawls cannot be released until reversed far enough to make the pins 38 move to center or neutral position in the slots 40 and, therefore, opposite pawls cannot engage until all tension is released and the rocker or gear pins 38 get past the center to the outer end of slots 40. While center plate 27 furnishes the drive, and the pins pull the load, the side disks 28, 29 with their pawls set in opposite directions, will then have to come to middle or neutral position before reversing the ratchet gear. This makes this transmission positively non-interlocking.

This device does not necessarily have to be used with hoisting drums, but can be used between any two machines of which one has to be positively cut off from power while the other revolves in opposite direction.

In the event that the hoist drums are mounted on one or more separate shafts, the arrangement shown in Figure 7, may be used. In that case the drums 41 and 42 on the main shaft 25 are to be replaced by chains 50 and sprocket gears 51, 52 for driving the drums 41a, 42a on the second shaft 25a. The construction would otherwise be the same.

In the event that the source of power should be connected directly to the main or center disk 27 as by sprocket chain or any other gear, the main disk 27 as well as the side disks would all run free on the main shaft 25.

It will also be understood that the hoist drums may be mounted not only as in Figure 7 on one separate shaft, but one shaft for each drum either on the same side or one shaft in front and another behind the main shaft, the construction of the transmission remaining the same.

It is to be understood that the invention as herein disclosed may be varied from the details described and shown without departure from the spirit of the subjoined claims.

I claim:

1. In a non-interlocking reversing transmission, a drive shaft, a main disk rigidly mounted thereon and a pair of secondary disks revolvable as regards said main disk, one on each side thereof, a driven member adjacent each of said secondary disks, a pawl and ratchet device between each of said driven members and the adjacent secondary disk to revolve the member in the same direction as the main shaft, and positive drive connection between said main and secondary disks; said driven member consisting of a hoisting drum; said ratchet device comprising a toothed plate secured on each of said drums, the teeth on one plate facing in opposite direction to the teeth on the other plate and ratchet pawls pivoted to rock on the respective secondary disks for engagement and disengagement with the respective ratchet plates; said positive drive connection consisting of gear pins fixed in said main disk extending transversely for free movement thru elongated openings in said secondary disks and engaging with the respective pawls to give the pawls a rocking motion sufficient to cause the same to engage the ratchet plate individual thereto as the gear pins move into positive driving engagement with the secondary disks.

2. In a non-interlocking reversing transmission, a drive shaft, a main disk rigidly mounted thereon and a pair of secondary disks revolvable as regards said main disk, one on each side thereof, a driven member adjacent each of said secondary disks, a pawl and ratchet device between each of said driven members and the adjacent secondary disk to revolve the member in the same direction as the main shaft, and positive drive connection between said main and secondary disks; said driven member consisting of a hoisting drum; said ratchet device comprising a toothed plate secured on each of said drums, the teeth on one plate facing in opposite direction to the teeth on the other plate and ratchet pawls pivoted to rock on the respective secondary disks for engagement and disengagement with the respective ratchet plates; said positive drive connection consisting of gear pins fixed in said main disk extending transversely for free movement thru elongated openings in said secondary disks and engaging with a slot inclined against the radius of the disk in the respective pawl to give the pawl a rocking motion sufficient to cause the same to engage the ratchet plate individual thereto as the gear pins move into positive driving engagement with the secondary disks.

3. In a non-interlocking reversing transmission, a drive shaft, a main disk rigidly mounted thereon and a pair of secondary disks revolvable as regards said main disk, one on each side thereof, a driven member adjacent each of said secondary disks, a pawl and ratchet device between each of said driven members and the adjacent secondary disk to revolve the member in the same direction as the main shaft, and positive drive connection between said main and secondary disks; said driven member consisting of a hoisting drum; said ratchet device comprising a toothed plate secured on each of said drums, the teeth on one plate facing in opposite direction to the teeth on the other plate and ratchet pawls pivoted to rock on the respective secondary disks for engagement and disengagement with the respective ratchet plates; said positive drive connection consisting of gear pins fixed in said main disk extending transversely for free movement thru elongated openings in said secondary disks and engaging with a slot inclined against the radius of the disk in the respective pawl to give the pawl a rocking motion; the slot in each pawl on the right hand secondary disk running oppositely to the slot on each pawl on the left hand disk, whereby the pawls will be made to rock into engagement with the ratchet teeth when said gear pin is at one extreme end of said slot and the gear pin has moved into positive driving engagement with said secondary disks, while the pawls will be held out of such engagement with the gear pin at the other end of said slot while an intermediary position of the gear pin in said slot will hold the pawls neutral.

4. In a non-interlocking reversing transmission, a drive shaft, a main disk rigidly mounted thereon and a pair of secondary disks revolvable as regards said main disk, one on each side thereof, a driven member adjacent each of said secondary disks, a pawl and ratchet device between each of said driven members and the adjacent secondary disk to revolve the member in the same direction as the main shaft, and positive drive connection between said main and secondary disks; said driven member consisting of a hoisting drum; said ratchet device comprising a toothed plate secured on each of said drums; the teeth on one plate facing in opposite direction to the teeth on the other plate and ratchet pawls pivoted to rock on the respective secondary disks for engagement and disengagement with the respective ratchet plates; said positive drive connection consisting of gear pins fixed in said main disk extending transversely for free movement thru elongated openings in said secondary disks and engaging with the respective pawls a slot therein inclined substantially in the same direction as said ratchet teeth whereby the pawl will be made to rock into engagement with the ratchet teeth when said gear pin is at one extreme end of said slot and the gear pin has moved into positive driving engagement with said secondary disks, while the pawl will be held out of such engagement with the gear pin at the other end of said slot while an intermediary position of the gear pin in said slot will hold the pawl neutral. oarebwandn;

GEO. W. REITZ.

REFERENCES CITED

The following references are of record in the file of this patent:

UNITED STATES PATENTS

| Number | Name | Date |
|---|---|---|
| 1,543,675 | Lear | June 30, 1925 |